Aug. 23, 1966  P. T. DAY, JR  3,267,831
HEATING, COOLING AND VENTILATING SYSTEM
Filed Jan. 3, 1966  2 Sheets-Sheet 2
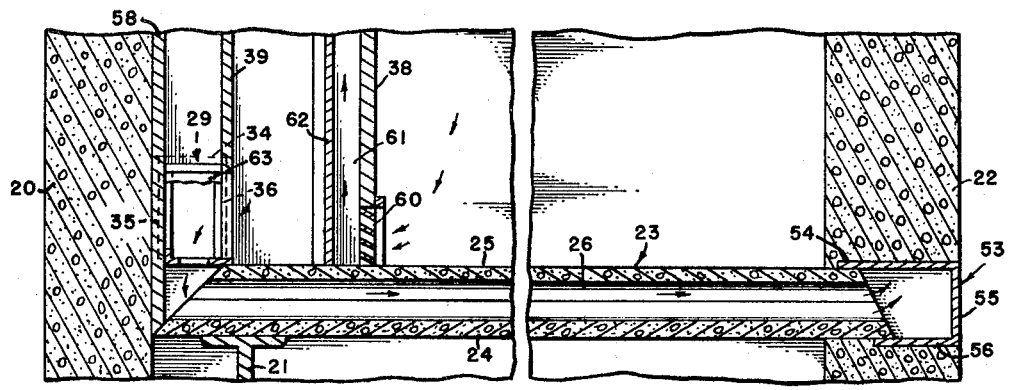
FIG. 5.
FIG. 4.
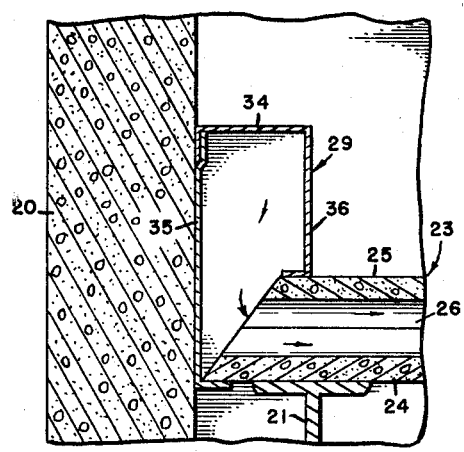
FIG. 3.
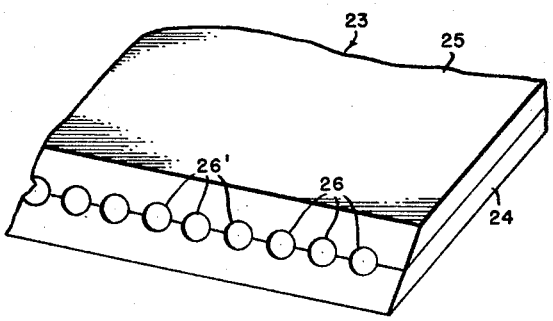
FIG. 6.
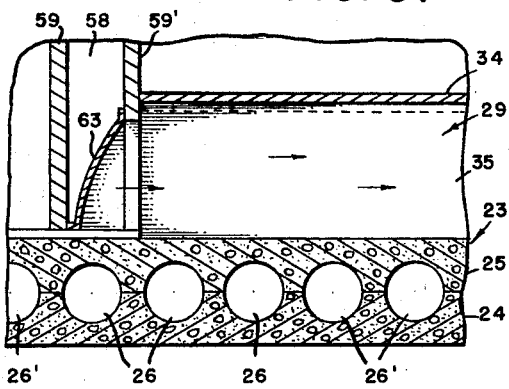
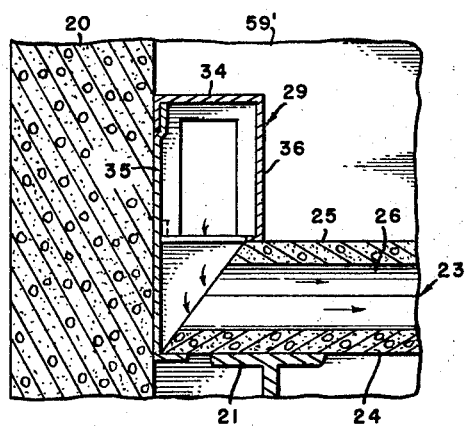
FIG. 7.
INVENTOR
PAUL T. DAY, Jr.
BY *Garvey & Garvey*
ATTORNEYS United States Patent Office 3,267,831
Patented August 23, 1966

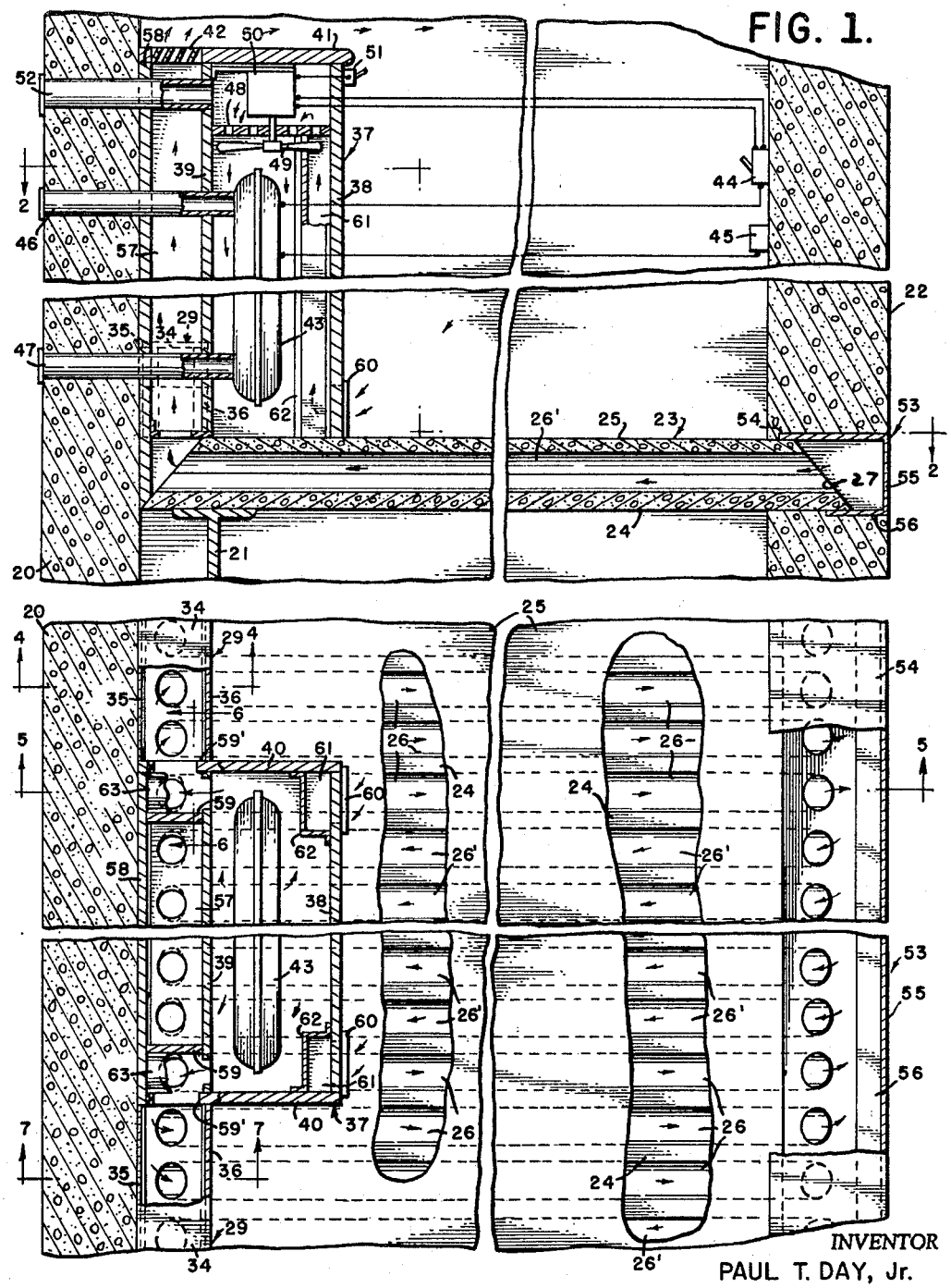

3,267,831
HEATING, COOLING AND VENTILATING SYSTEM
Paul T. Day, Jr., Baltimore, Md., assignor to American Metalcore Systems, Inc., Baltimore, Md.
Filed Jan. 3, 1966, Ser. No. 518,452
6 Claims. (Cl. 98—33)

This invention relates to a heating, cooling and ventilating system for a building and is a continuation-in-part of application, Serial Number 204,383, filed June 22, 1962 and now Patent No. 3,237,546, granted March 1, 1966.

It is an object of this invention to provide a combination radiant heating and forced air ventilating system, a combined air conditioning and ventilating system, or a ventilating system, carried out by means of common equipment, parts of which are selectively operable to effect the desired heating, cooling or ventilation of a room or area of a building.

Another object is to provide a system of the character described, including a floor or floor/ceiling, having incorporated therein, a plurality of conduits coextensive with the room or area to be heated or cooled, through which the air passes to effect radiant heating or cooling of the floor surface at an even temperature throughout.

Other objects are to provide a floor structure having a plurality of air conduits, the floor structure comprising upper and lower sections, the upper portion of which is constructed of a reflective material and the lower portion being reflective or having insulating properties; to provide a system of the character described wherein air passing through the floor conduits is forced into the room area for heating or cooling the latter, and then returned to an air-treating unit for heating or cooling and re-circulation; to provide a system for introducing fresh air to the circulatory supply system of the room or area which may be recirculated with the heated or cooled air, or may be recirculated independently; and to provide a practical and economical system of the character described, which may be readily installed in a room or area of a building, without the usual time-consuming operations heretofore required.

Other objects of the invention will be manifest from the following description of the present preferred form of the invention, taken in connection with the accompanying drawings, wherein:

FIG. 1 is a fragmentary sectional view of an area of a building equipped with the present system, for heating, cooling or ventilating air in an area of a building, showing to advantage the manner of circulating air through the system;

FIG. 2 is a fragmentary sectional view taken along the lines 2—2 of FIG. 1, looking in the direction of the arrows;

FIG. 3 is a fragmentary perspective view of a floor unit constructed in accordance with the present system;

FIG. 4 is an enlarged sectional view of the header duct illustrating the manner of delivering air to the floor unit;

FIG. 5 is a fragmentary sectional view taken along the lines 5—5 of FIG. 2, looking in the direction of the arrows and showing to advantage the direction of movement of air through the system;

FIG. 6 is an enlarged fragmentary sectional view taken along the lines 6—6 of FIG. 2, looking in the direction of the arrows; and FIG. 7 is an enlarged sectional view taken along the lines 7—7 of FIG. 2, looking in the direction of the arrows.

Referring now in greater detail to the drawings, the present system is shown installed in an area of a building which includes an outer wall 20, floor supports 21, and an inner wall 22. Supports 21 are adapted to hold a plurality of combination floor and duct panels 23. Each panel 23 includes a lower portion 24 which is preferably made of an insulating cementitious material but which, if desired, may be made of a reflective cementitious material. The panel further includes an upper portion 25, constructed of a reflective cementitious material. As shown to advantage in FIGS. 3 and 6, each panel 23 is further provided with a plurality of central longitudinally extending ducts or conduits 26 and 26', of any desired shape, formed between the upper and lower portions of the panel. As shown to advantage in FIG. 2, air is passed through conduits 26 in one direction, and through conduits 26' in the opposite direction, in a manner which will hereinafter be more fully set out.

The opposite longitudinal ends of the panels are beveled, as indicated at 27 for facile connection at one end with a trunk line or header duct 29 which is coextensive with beveled panel terminal 27. Header duct 29 is of box-like configuration and, as shown in FIGS. 4, 5 and 7, includes a top 34, a back 35 and a front 36, the latter being connected to panels 23. The bottom of the header duct is open for communication with longitudinal ducts 26 and 26' of floor panels 23.

In accordance with the objects of the present invention, there is provided a heating, cooling and ventilating plenum 37 which is in spaced relation to wall 20. Plenum 37 includes a front wall 38, a rear wall 39, side walls 40 and a top 41.

A conventional combination heating and cooling unit 43, of any desired size, is mounted within plenum 37 and electrically connected to a switch 44 and thermostat 45 which may be mounted on inner wall 22. Switch 44 controls selective operation of the cooling or heating functions of unit 43. An exhaust duct is indicated at 46, and an air supply duct designated 47, are in communication with unit 43. Superjacent unit 43 is a perforated grille 48, through a central portion of which extends a fan 49, driven by suitable motive means 50. Switch 44 and thermostat 45 also control operation of fan 49, the latter being run at a faster rate of speed during an air conditioning operation than during a heating operation. A manual control switch is indicated at 51 for operating the fan independently of unit 43, to ventilate the room or area.

A fresh air intake 52 extends through outside wall 20 and is in communication with the interior of plenum 37 at a point between top 41 and fan 49, for admixing fresh air with air drawn into the plenum from the room interior.

In accordance with the teaching of the present invention, the longitudinal terminals of panels 23 are extended to a point within wall 22 where they are in communication with a header duct 53 which also lies within the confines of wall 22 and is complementally beveled with respect to the adjacent beveled terminals 27 of panels 23. Duct 53 includes a top 54, a back 55, and a bottom 56, which duct opens into ducts 26 and 26' of panels 23 and are coextensive therewith. Header duct 53 performs the function of retaining the air rather than expelling it into the room or area.

The air received by duct 53 is returned in the direction of plenum 37, through ducts 26' and is directed upwardly through a room vent stack 57 formed between a wall 58 contiguous with outer wall 20 and plenum 37 which is spaced from the outer wall. Spaced inner and outer side walls for the vent stack are indicated at 59 and 59', through which walls duct 29 passes. A ventilating grille 42 is positioned superjacent vent stack 27 at a point uniplanar with top 41 of plenum 37 to permit passage of air flowing up the vent stack into the room or area.

Spaced return vents 60 are positioned in front wall 38 near its lower extremity to permit air from the room or area to pass into return stacks 61 formed by the plenum outer wall 38 and an interior wall 62.

It is within the contemplation of this form of the present invention to direct air which has been heated or cooled by unit 43 only to those conduits of panels 23 which lie laterally of plenum 37. For carrying out this purpose, there is provided an arcuate plate 63 between vent stack 57 and the interior of plenum 37 for preventing admixture of air in stack 57 and that air flowing past heating and cooling unit 43.

In use, when the system of the present invention is to be operated for heating or cooling, thermostat 45 is set at the desired temperature and switch 44 actuated for the selected function. This actuates fan 49 and forces air past unit 43 to heat or cool the latter, depending upon the particular function for which switch 44 is set. Air which has been heated or cooled by unit 43 passes downwardly through lateral openings in rear wall 39 of plenum 37, between walls 59 and 59′ into duct 29. The air is then directed into conduits 26 only, which lie laterally adjacent plenum 37. As indicated in FIG. 2, air passing through conduits 26 moves across the room to duct 53 whereupon it is directed back through conduits 26′ only of centrally located panels 23 to vent stack 57. The air passes upwardly through stack 57, past grille 42 to the room or area.

The actuation of fan 49 causes air from the room or area to be drawn through return vent 60 into return stacks 61, from which point the air is drawn upwardly through a portion of grille 48. As shown in FIG. 1, the return air is then mixed with fresh air entering through fresh air intake 52. The air mixture is next drawn downwardly by fan 49, past heating and cooling unit 43 and the heating or cooling cycle is repeated.

When it is desired to ventilate the room or area without producing a heating or cooling effect therein, fan switch 51 is actuated to circulate the air mixture comprising air from the room and fresh air from the outside. This admixture is circulated in the same manner as above described in connection with heated or cooled air.

While a preferred embodiment of this invention has been shown and described, it is nevertheless to be understood that various changes may be made therein, without departing from the spirit and scope of the appended claims.

I claim:

1. A heating, cooling and ventilating system for an area of a building including a floor having longitudinally extending air conduits coextensive therewith, ducts at opposite ends of the floor extending transversely of, and in communication with the air conduits of the floor, air treating means adjacent to, and in communication with, one of said ducts, a vent stack adjacent said air treating means, said vent stack being in communication with selected air conduits of floor and with the area, and means for directing air through said air treating means and through the remainder of said air conduits to the duct remote from said air treating means, said means returning the air through said selected conduits to said vent stack for delivery to the area.

2. A heating, cooling and ventilating system for an area of a building, including a floor comprising panels, each having a lower insulating portion and an upper reflective portion, air conduits formed by said panels between said upper and lower portions, opposite terminals of said panels being beveled, closed ducts at each beveled end of said panels extending transversely of the latter, the lower extremities of said closed ducts being beveled for ready connection with the beveled terminals of said panels, for communication of said ducts with said air conduits, a plenum at one extremity of said floor adjacent to, and in communication with, one of said ducts, a heating and cooling unit within said plenum, air supply and exhaust means connected to said heating and cooling unit, a fan within said plenum superjacent said heating and cooling unit, for directing air past the latter into one of said ducts, a vent stack adjacent said plenum, said vent stack being in communication with selected air conduits of the floor and with the area, means for directing air through said plenum and through the remainder of said air conduits to the duct remote from said plenum, said means returning the air through said selected conduits to said vent stack for delivery to the area.

3. The heating, cooling and ventilating system of claim 2 with the addition of a control switch operatively connected to said fan for operating the latter independently of said heating and cooling unit, to effect ventilation of said area.

4. A heating, cooling and ventilating system for an area of a building, including combination floor and air duct panels arranged with the air duct passages extending longitudinally of the area, the opposite longitudinal terminals of said panels being beveled, transverse header ducts in communication with the beveled panel terminals of said panels, air treating means adjacent to and in communication with, one of said header ducts, a vent stack adjacent said air treating means, said vent stack being in communication with selected air duct passages, and means for directing air through said air treating means and through the remainder of the air duct passages to the header duct remote from said air treating means, said directing means returning the air through said selected air duct passages to said vent stack for delivery to the area.

5. The heating, cooling and ventilating system of claim 4 with the addition of a return vent in the area in communication with said air treating means.

6. The heating, cooling and ventilating system of claim 4, wherein each of said panels includes an upper portion constructed of a reflective material throughout, and a lower portion constructed of an insulating material throughout.

References Cited by the Examiner

UNITED STATES PATENTS

| 2,182,686 | 12/1939 | Young | 165—49 |
| 2,195,691 | 3/1940 | Burt | 237—69 |
| 2,225,244 | 12/1940 | Anderson | 237—69 |
| 2,641,449 | 6/1953 | Antony | 50—263 X |

ROBERT A. O'LEARY, *Primary Examiner.*

C. SUKALO, *Assistant Examiner.*